United States Patent
Franco et al.

(10) Patent No.: US 6,750,628 B2
(45) Date of Patent: Jun. 15, 2004

(54) FLUX SHUNT WAVE SHAPE CONTROL ARRANGEMENT FOR PERMANENT MAGNET MACHINES

(75) Inventors: Alberto Franco, Hazlet, NJ (US); John McGarvey, Laurence Harbor, NJ (US); Daniel Kane, Edison, NJ (US); Michael Salata, Fords, NJ (US)

(73) Assignee: Electric Boat Corporation, Groton, CT (US)

( * ) Notice: Subject to any disclaimer, the term of this patent is extended or adjusted under 35 U.S.C. 154(b) by 187 days.

(21) Appl. No.: 10/006,946

(22) Filed: Dec. 3, 2001

(65) Prior Publication Data

US 2003/0102840 A1 Jun. 5, 2003

(51) Int. Cl.$^7$ ................................................ H02P 7/36
(52) U.S. Cl. ...................................................... 318/727
(58) Field of Search ............................... 318/727, 805, 318/807, 432, 434, 801

(56) References Cited

U.S. PATENT DOCUMENTS

| | | |
|---|---|---|
| 2,078,805 A | 4/1937 | Merrill |
| 2,610,993 A | 9/1952 | Stark |
| 2,713,128 A | 7/1955 | Toffolo |
| 2,836,743 A | 5/1958 | Braun |
| 3,482,126 A | 12/1969 | Bradley |
| 3,508,094 A | 4/1970 | Byrne |
| 3,564,314 A * | 2/1971 | Haydon ............... 310/172 |
| 3,567,977 A | 3/1971 | McLean |
| 3,735,226 A | 5/1973 | Pittner |
| 3,965,407 A | 6/1976 | Stoner |
| 4,019,107 A | 4/1977 | Dixon et al. |
| 4,023,083 A | 5/1977 | Plunkett |
| 4,041,361 A | 8/1977 | Cornell |
| 4,088,935 A | 5/1978 | D'Atre et al. |
| 4,206,389 A | 6/1980 | Synder |
| 4,259,620 A | 3/1981 | Oates et al. |
| 4,278,907 A | 7/1981 | Landgraf et al. |
| 4,453,116 A | 6/1984 | Bose |
| 4,486,678 A | 12/1984 | Olson |
| 4,499,413 A | 2/1985 | Izosimov et al. |
| 4,503,375 A | 3/1985 | Okuyama |
| 4,517,471 A | 5/1985 | Sachs |
| 4,656,379 A | 4/1987 | McCarty |
| 4,882,515 A | 11/1989 | Radomski |
| 4,885,493 A | 12/1989 | Gokhale |
| 4,935,708 A | 6/1990 | Weldon et al. |
| 5,196,778 A | 3/1993 | Hayashida |
| 5,272,429 A | 12/1993 | Lipo et al. |
| 5,313,151 A | 5/1994 | Ogden et al. |
| 5,386,186 A | 1/1995 | Gritter |
| 5,443,321 A | 8/1995 | Honda et al. |
| 5,443,351 A | 8/1995 | Yamamura et al. |
| 5,449,986 A | 9/1995 | Dozor |
| 5,541,488 A | 7/1996 | Bansal et al. |
| 5,644,458 A | 7/1997 | Schoen et al. |
| 5,650,700 A | 7/1997 | Mutoh et al. |
| 5,656,911 A | 8/1997 | Nakayama et al. |
| 5,659,235 A | 8/1997 | Yamada et al. |
| 5,825,113 A | 10/1998 | Lipo et al. |
| 5,854,547 A | 12/1998 | Nakazawa |
| 5,965,995 A | 10/1999 | Seibel et al. |
| 6,037,691 A | 3/2000 | Akemakou |
| 6,072,257 A | 6/2000 | Akemakou |
| 6,093,992 A | 7/2000 | Akemakou |
| 6,137,258 A | 10/2000 | Jansen |
| 6,147,429 A | 11/2000 | Akemakou |

* cited by examiner

Primary Examiner—Karen Masih

(57) ABSTRACT

In the embodiments described in the specification, a permanent magnet machine includes a stator having windings which intercept flux received from peripheral pole pieces in a rotor generated by permanent magnets disposed between the pole pieces. In order to control the flux passing through the stator windings, flux shunts are provided between the pole pieces and a winding on the core of each flux shunt generates flux in the shunt in proportion to current supplied to the winding so as to decrease the flux from the magnets which can be diverted from the pole pieces through the shunt. Current is supplied to the flux shunt windings in accordance with the instantaneous difference between the wave shape of the output from the machine and a desired wave shape stored in a control unit. An encoder supplies a signal to the control unit indicating the instantaneous position of the rotor with respect to the stator.

5 Claims, 3 Drawing Sheets

FLUX SHUNT WAVE SHAPE CONTROL ARRANGEMENT FOR PERMANENT MAGNET MACHINES

BACKGROUND OF THE INVENTION

This invention relates to methods and arrangements for controlling the wave shape in permanent magnet machines.

In certain permanent magnet machines such as alternators harmonics can be injected into the output to vary the wave shape by adding an external transformer to the system. For this purpose an external transformer has a secondary winding connected in series with the output from the alternator and a primary winding which is energized from an external source such as a signal generator/linear power amplifier combination or by a small alternator that generates a high frequency output. External transformers in such systems are typically large and moderately expensive devices that are designed to suit particular applications. For low frequency operation the transformers can be even larger.

Linear power amplifiers generally have poor efficiency and must have appreciable size if used for introducing significantly large harmonics. In such systems an external power source is necessary for the power amplifier and the signal generator has to be synchronized in phase with the power line for the main alternators. If a small alternator is used instead of a signal generator/power amplifier combination, it must also be mechanically synchronized to the main alternator, for example, by being mounted on a common shaft with the main alternator. Because of its high cost, complex set-up and limited flexibility such external transformer arrangements are seldom used except for laboratory applications.

It is also possible to create a variety of wave shapes by using a single or multiphase inverter with an electronic control system. Such arrangements convert a direct current link voltage to a single phase or multiphase AC voltage output with virtually any desired harmonic content. Inverters are electronic devices that can approximate wave shapes by the rapid switching of a DC voltage which generates high frequency harmonics that must be filtered out in many applications. Inverters require the use of a DC source for power and consequently they must be connected either to a DC power supply or to an AC power supply having a rectified output. This additional circuitry increases cost, size and complexity to the system. For these reasons, inverters are normally used in applications in which a source with variable voltage and frequency output is necessary and wave shape control is not a primary objective.

The Akemakou U.S. Pat. Nos. 6,037,691, 6,072,257, 6,093,992 and 6,147,429 discloses permanent magnet machines having a rotor containing permanent magnets and a core with a control coil for controlling the amount of flux from the permanent magnets passing into or avoiding paths extending through the surrounding stator coils. The control coils are energized to increase or decrease the flux from the permanent magnets linking the stator coils to control the output voltage.

The Lipo et al. U.S. Pat. No. 5,825,113 discloses a permanent magnet machine having permanent magnets in the stator together with field windings for increasing or decreasing the flux generated by the permanent magnets to control the output torque of the rotor driven by power supplied to the stator when the machine is operated as a motor or the power generated when the machine is operated as a generator.

The patent to Gokhale U.S. Pat. No. 4,885,493 discloses a permanent magnet alternator with a flux diversion member resiliently coupled to the permanent magnet rotor to permit variation of the relative rotary position of the flux diversion member so as to control the alternator output voltage.

The Byrne U.S. Pat. No. 3,508,094 discloses a permanent magnet AC generator in which the shape of the output wave is modified by providing screened zones between the permanent magnets in the rotor in which there is substantially no radial flux density from the permanent magnet poles.

SUMMARY OF THE INVENTION

Accordingly, it is an object of the present invention to provide a wave shape control arrangement for permanent magnet machines which overcomes disadvantages of the prior art.

Another object of the invention is to provide a permanent magnet machine capable of providing an output having a desired wave shape.

These and other objects of the invention are attained by providing a permanent magnet machine having a rotor containing permanent magnets and flux shunts containing control windings along with a control unit for controlling the flux in the shunts based on differences between the wave form of the output and a reference wave form in order to control the wave shape of the output from the machine. In a preferred arrangement, current is supplied to the flux shunt windings from a rotary transformer or exciter that rotates with the rotor and the AC power generated in the exciter or rotating transformer is converted to DC power by rectifiers positioned on the rotating assembly. To control the current supplied to the flux shunt windings a controller senses the output wave form from the machine and compares it with the reference wave form to produce a difference signal to adjust the flux shunt current.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
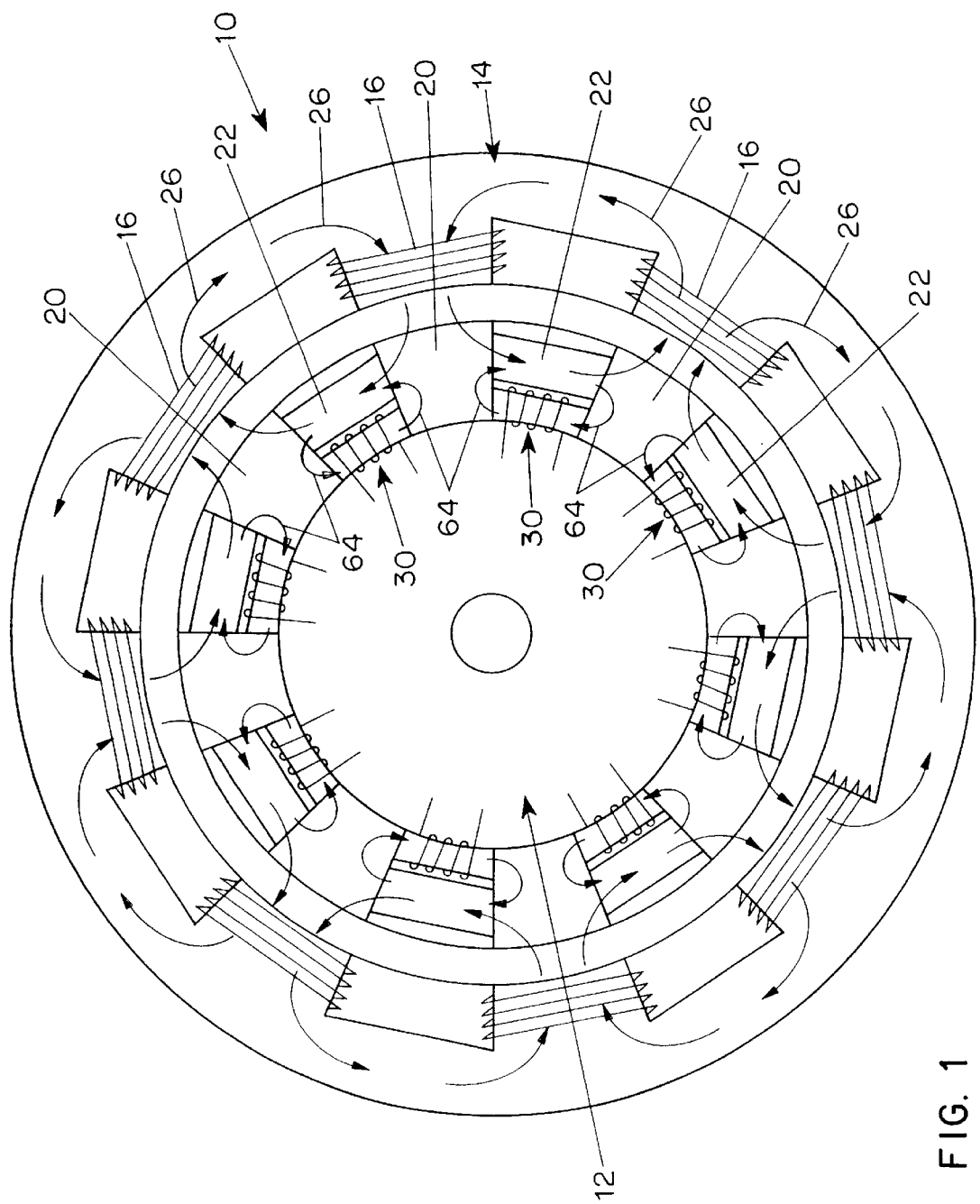
FIG. 1 is a schematic cross-sectional view illustrating a representative embodiment of a rotor for a permanent magnet machine having flux shunts arranged in accordance with the invention.

In the typical permanent magnet machine 10 illustrated schematically in FIG. 1, a rotor 12 is supported for rotation within a stator 14 having a circumferentially spaced array of coils 16 arranged to interact with flux fields extending radially outwardly from a circumferentially array of pole pieces 20 in the rotor 12. Between each adjacent pair of pole pieces 20 in the rotor a permanent magnet 22 is oriented with magnetic poles facing the adjacent pole pieces so as to produce a flux field 26 extending into the pole pieces and projecting radially outwardly and through the stator 14 so as to intercept the windings 16 as the rotor rotates within the stator. Motion of the flux field through the stator windings generates a current in the windings which has on oscillating wave shape.

The instantaneous voltage resulting from the current generated or induced in the stator windings is a function of the rotational speed of the rotor, the winding and design geometry of the stator and the amount of permanent magnet flux that links with the stator windings. When the machine is operated as an alternator its terminal output voltage is the voltage induced in the stator windings minus the voltage drop across the stator impedance, whereas, if the machine is operated as a motor, the induced stator winding voltage is a back or counter EMF that affects the instantaneous line current of the machine.

The winding and geometry of the machine are fixed by the design particulars and the rotational speed is maintained constant, at least over the short term, by the rotating inertia of the rotor. With these parameters remaining essentially constant the amount of permanent magnet-generated flux that links the stator winding is the only variable that can be controlled to influence the voltage generated in the stator winding and therefore the instantaneous terminal voltage or stator current, which is detected at the output of the machine by isolated voltage/current sensors 24 as shown in FIG. 2.

Figure 2:
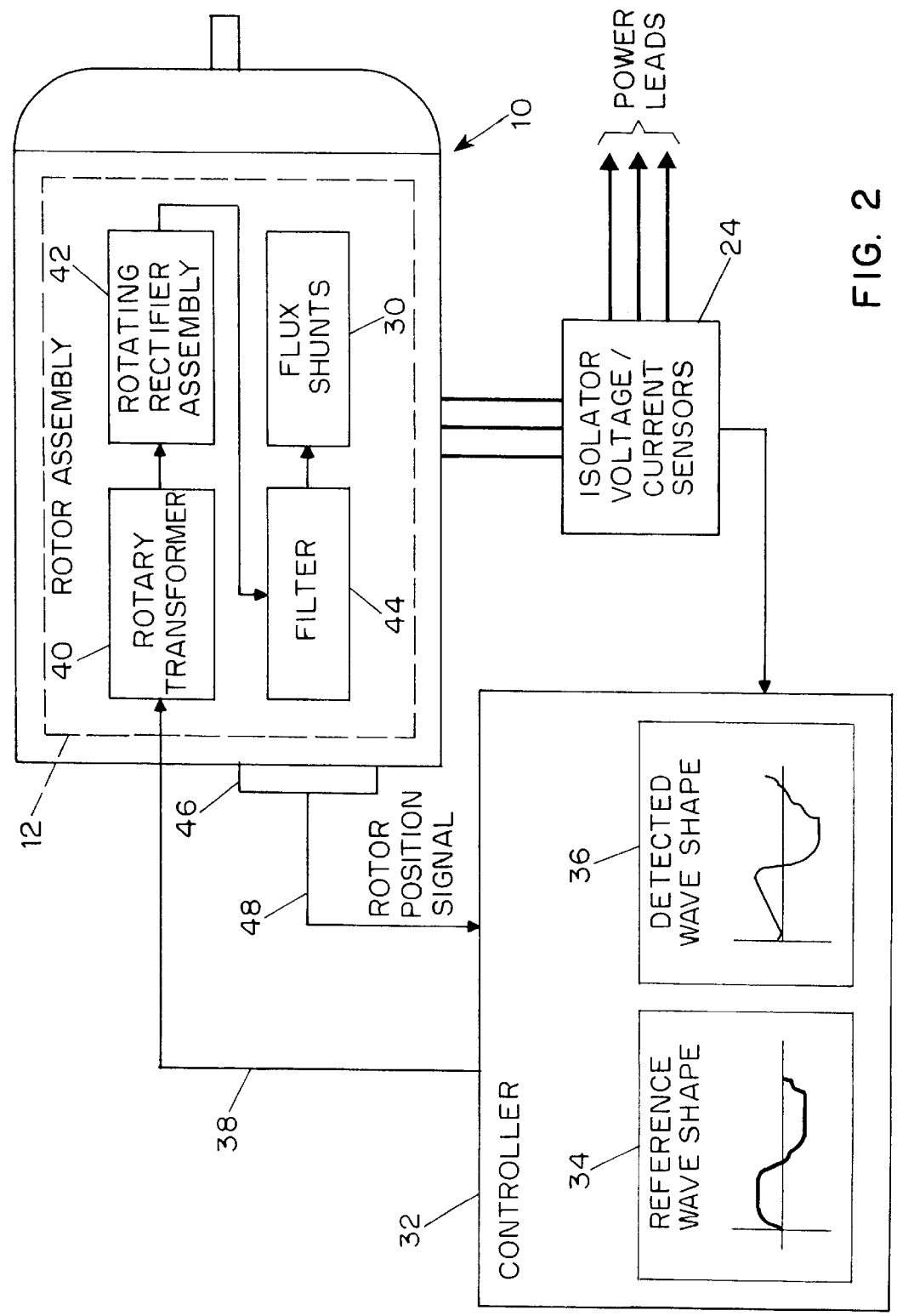
FIG. 2 is a schematic block diagram illustrating a representative flux shunt wave shape control system for use in the invention.

In order to control the instantaneous voltage generated by the machine in accordance with the invention, the rotor 12 contains flux shunts 30 extending between each adjacent pair of pole pieces 20 and having windings which receive control current generated by a controller 32 shown in FIG. 2. The controller 32, which has a stored reference wave shape 34 representative of the desired output wave shape of the machine and receives a generated wave shape 36 corresponding to the instantaneous output of the machine as detected by the sensors 24, generates a flux shunt current command signal on a line 38 based on the difference between the reference wave shape and the detected wave shape.

The command signal on the line 38 is supplied to a rotary transformer or exciter 40 which rotates with the rotor 12 and supplies an output to a rectifier assembly 42. The rectified output from the rectifier assembly is supplied through a filter 44 to the flux shunts 30 in the rotor and an encoder 46, rotating with the rotor 12, supplies a signal on a line 48 indicating the instantaneous angular position of the rotor so that the controller 32 can make an appropriate comparison of the detected wave shape 36 with the reference wave shape 34 and supply a signal on the line 38 which energizes the flux shunts 30 at the appropriate times and in the appropriate manner to control the flux in the flux path 26.

Figure 3:
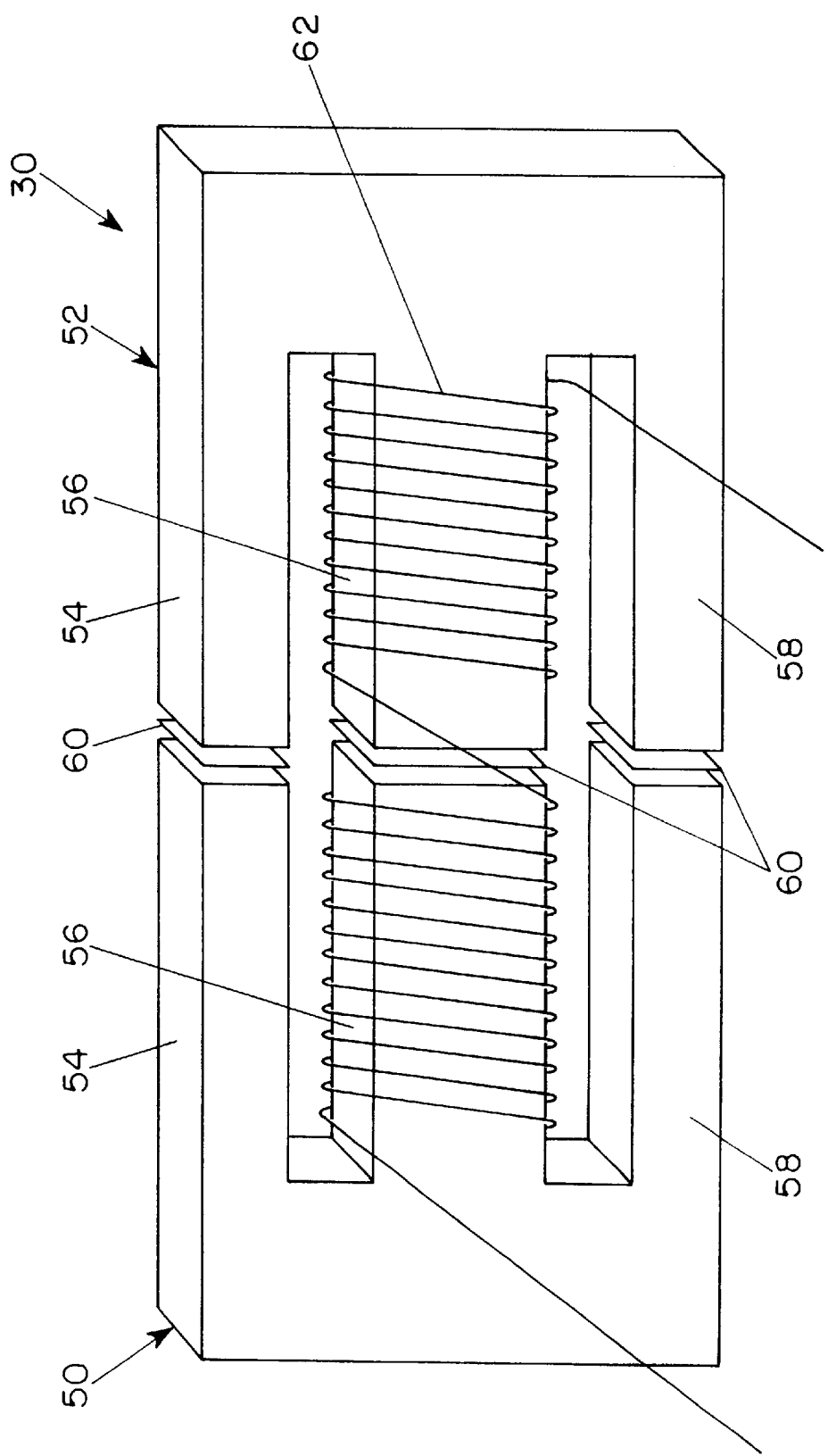
FIG. 3 is an enlarged view schematically illustrating a representative flux shunt used in the rotor shown in FIG. 1.

FIG. 3 schematically illustrates a representative arrangement of a flux shunt 30 to control the flux through the adjacent pole pieces 20 in a desired manner. As shown in FIG. 3 a typical flux shunt 30 consists of two E-shaped magnetic core members 50 and 52 with facing legs 54, 56 and 58 separated by nonmagnetic, nonconductive spacers 60. The center legs 56 of the magnetic core members are surrounded by a winding 62 which is energized by the rectified control signal received from the filter 44. The nonmagnetic spacers 60 between the legs of the magnetic core members have the effect of lowering the inductance of the core members to reduce the flux shunt time constant and thereby increase the rate at which the magnetic flux in the path 26 linking the stator windings can change.

When the flux shunt winding 62 is not energized, the high permeability of the shunt flux core material allows the permanent magnet flux from adjacent pole pieces 20 to flow freely through the core of the flux shunt, providing an alternative path 64, shown in FIG. 1, for the flux passing into the pole pieces 20 from the magnets 22, thereby minimizing the amount of flux in the flux path 26 that links the stator windings. When the winding 62 is energized with DC current an internal flux is developed within the flux shunt cores reducing the amount of the flux from the pole pieces which can be bypassed in the path 64 through the shunt and thereby increasing the flux directed through the flux path 26 to link the stator windings. Thus, the flux shunt functions as a valve to control the amount of permanent magnet flux that links the stator windings of the machine.

As a result, the controller 32 can control the instantaneous flux passing from each rotor pole to adjacent stator windings and thereby control the wave shape of the voltage or the counter EMF wave shape generated by the flux. Since the control signal is based on the instantaneous difference between the detected wave shape and the reference wave shape, the output from the permanent magnet machine can be controlled to produce a wave shape corresponding to the reference wave shape, thereby compensating for nonlinear behavior of magnetic components, for load changes, and for other influences on the output from the machine.

Although the invention has been described herein with reference to specific embodiments, many modifications and variations therein will readily occur to those skilled in the art. Accordingly, all such variations and modifications are included within the intended scope of the invention.

We claim:

1. A permanent magnet machine control arrangement comprising:

a stator having a plurality of windings;

a rotor disposed for rotation within the stator having a plurality of pole pieces and a plurality of permanent magnets disposed between the pole pieces to generate magnetic flux extending from the pole pieces to intercept the windings in the stator during rotation of the rotor;

a plurality of magnetic shunts disposed between adjacent pole pieces, each shunt having a winding to generate flux in the shunt in proportion to the current supplied to the winding to thereby reduce flux shunted through the shunt from adjacent pole pieces and increase flux extending from the pole pieces to intercept windings in the stator; and a control unit for comparing the instantaneous output of the machine with a wave form representing a desired instantaneous output and generating a difference signal to control the instantaneous energization of the windings in the flux shunts in the rotor and thereby control the wave shape of the output from the machine to conform to a desired wave shape.

2. A permanent magnet machine control arrangement according to claim 1 including an encoder rotating with the rotor and supplying a signal to the control unit to indicate the instantaneous position of the rotor.

3. A permanent magnet machine control arrangement according to claim 1 wherein each flux shunt includes at least two core members spaced by a nonmagnetic, nonconductive spacer.

4. A permanent magnet machine control arrangement according to claim 1 wherein the control unit has a stored reference wave shape for comparison with a detected wave shape from the machine.

5. A permanent magnet machine control arrangement according to claim 1 wherein the rotor includes a rotary transformer for generating an AC voltage, a rectifier for rectifying the voltage from the rotary transformer, and a filter for providing a filtered DC output from the rectifier to the windings on the flux shunts.

* * * * *